3,365,414
PROCESS FOR MAKING AN ALKYLATED MELAMINE-FORMALDEHYDE STABILIZED POLYMER DISPERSION

William W. Fisk, Kansas City, Kans., and Richard D. Kincheloe and Howard J. Wright, Kansas City, Mo., assignors to Cook Paint & Varnish Company, Kansas City, Mo., a corporation of Delaware
No Drawing. Filed Nov. 15, 1966, Ser. No. 594,370
9 Claims. (Cl. 260—33.4)

ABSTRACT OF THE DISCLOSURE

A process for obtaining a stable polymer dispersion or organosol which comprises copolymerizing (1) a vinyl monomer which is free from functional —OH and —COOH groups and (2) an acrylic or methacrylic monomer containing a functional —OH and/or —COOH group, in the presence of (3) a solution of an alkylated melamine-formaldehyde reaction product dissolved in an essentially aliphatic hydrocarbon in which the copolymer of components (1) and (2) is insoluble.

---

The present invention relates to certain novel melamine-formaldehyde/acrylic polymer compositions. More particularly, the invention is concerned with the provision of stable dispersions or organosols of polymers of the type indicated which are of particular advantage for use as coating compositions.

Broadly stated, the dispersions of the invention are prepared by copolymerizing (1) one or more vinyl monomers which are free from functional —OH and —COOH groups, and (2) an acrylic or methacrylic monomer containing at least one functional —OH and/or —COOH group in the presence of (3) an alkylated melamine-formaldehyde reaction product dissolved in a solvent which is primarily aliphatic hydrocarbon and in which the copolymer of components (1) and (2) is insoluble.

The exact mechanism of the polymerization involved in the present invention is not fully understood. However, it appears that as monomer components (1) and (2) copolymerize, some interaction also occurs between the —OH and/or —COOH groups of component (2) and the dissolved melamine-formaldehyde reaction product so that the insoluble copolymer is randomly joined to the melamine-formaldehyde through this interaction and thus kept in a stabilized finely dispersed state. Whatever the explanation or mechanism involved, it is highly unexpected that a stable polymer dispersion is obtained under the conditions of the present invention.

An important feature of the invention is the use of a solvent for the melamine-formaldehyde reaction product which is essentially aliphatic hydrocarbon and in which the copolymer of components (1) and (2) is insoluble. Aromatic solvents such as benzene, toluene, xylene or aromatic naphthas are not suitable for present purposes. Advantageously the solvent employed is selected from heptane, iso-octane, nonane, decane, cyclohexane, i.e., straight, branched or cyclic saturated aliphatic hydrocarbon solvents. Minor amounts of alkanols such as butyl up to lauryl alcohol may be included. The amount of solvent employed can be widely varied but should be adequate to dissolve all the melamine-formaldehyde reaction product and provide an easily manageable polymerization medium.

The alkylated melamine-formaldehyde used herein is usually a butylated melamine-formaldehyde condensate although the alkylated derivatives obtained with higher or lower alcohols than butanol, e.g., lauryl alcohol, can be advantageously used. Such condensates are well known in the coating art and conventional procedures may be used for preparing the same for use herein. Generally speaking, the alkylated melamine-formaldehyde condensates used in the present process are characterized by relatively high naphtha tolerances, i.e., in excess of 15 and preferably in the order of 200 and above.

Any vinyl monomer which is free from functional —OH and —COOH groups, or mixtures of such monomers may be used as the monomeric component (1) herein. Typical examples of such monomers are the alkyl acrylates and methacrylates, styrene, acrylonitrile and acrylamide. Specific illustrations are the esters of methacrylic acid and acrylic acid with alkanols such as ethyl acrylate, 2-ethyl hexyl acrylate, butyl acrylate, methyl methacrylate, butyl methacrylate or the like.

Typical examples of acrylic or methacrylic monomers which contain at least one —OH and/or —COOH groups and are useful herein as component (2) include the hydroxy alkyl acrylates or methacrylates, particularly 2-hydroxy propyl methacrylate, 2-hydroxy ethyl methacrylate, the corresponding acrylates, acrylic acid, methacrylic acid and mixtures of two or more of these. Usually, it is preferred to use, on a weight basis, 60–98% of component (1) and 2–40% component (2) for the copolymerization although it will be recognized that proportions outside these ranges may also be used.

The amount of melamine-formaldehyde condensate employed can also be widely varied. Generally speaking, however, the amount of melamine-formaldehyde condensate to total copolymer components will be in the range of 5 to 50% condensate for 50 to 95% copolymer component, by weight.

The copolymerization of the invention is advantageously carried out by gradually adding the monomer components, along with a suitable free radical catalyst, to a heated solution of the alkylated melamine-formaldehyde condensate in a solvent as aforesaid. Representative catalysts for use herein include azobisisobutyrlnitrile, peroxides such as lauroyl peroxide and benzoyl peroxide, hydroperoxides, and the like. Polymerization temperatures and times may be widely varied depending on other conditions. However, temperatures in the range of 60–85° C. and times varying from 1–10 hours or more may be mentioned as representative.

As noted earlier, the products obtained by the present process comprise dispersions of copolymer particles which are stabilized by means of the melamine-formaldehyde condensate dissolved in the essentially aliphatic hydrocarbon solvent. The main polymer represented by the dispersed particles is the copolymer of components (1) and (2) with possibly some graft polymer also being formed between the —OH and/or —COOH groups and the melamine-formaldehyde condensate to bring about stabilization of the dispersed copolymer. The dispersed polymer will usually have a molecular weight in the range of 50,000–150,000 although this can be varied as desired. The resulting dispersion, which may have a solids content of up to, for example, 50–60% solids, is highly useful for coating purposes where a thermoset system is desired.

The invention is further illustrated by the following examples wherein parts and percentages are by weight unless otherwise indicated:

EXAMPLE 1

*Part A*

20 parts melamine, 61 parts butyl formaldehyde solution (40%), 17 parts butyl alcohol and 2 parts triethyl amine were heated to reflux for 20 minutes. Thereafter 0.5 part phthalic anhydride was added to effect butylation of the melamine-formaldehyde reaction product. The reaction mixture was heated to remove water for seven hours until a naphtha tolerance of 18–20 was reached. Butyl alcohol was removed until a viscosity of I–K (50%), Gardner-Holdt, in butanol was obtained. The ratio of formaldehyde to melamine in the product was about 5:1.

*Part B*

100 parts of the above product (at 50% solids in butanol) were dissolved in 250 parts cyclohexane and heated to 75° C. with stirring in a nitrogen atmosphere. Thereafter 650 parts of a mixture of 400 parts methyl methacrylate, 50 parts hydroxypropyl methacrylate, 9 parts lauroyl peroxide and 191 parts cyclohexane, were added dropwise over a five hour period while maintaining the temperature at 74°–76° C. After all of the mixture had been added, the temperature was held at 74°–75° C. for one hour and then the heat was turned off. The reaction mixture was allowed to cool slowly for thirty minutes with agitation and then cooled rapidly to room temperature. The reaction mixture was a thick smooth syrup of finely dispersed particles with a polymer solids content of about 50–55%. The product was cast onto a metal substrate and then baked to give a clear, hard film of outstanding properties.

EXAMPLE 2

200 parts of the product obtained according to Part A of Example 1 were dissolved in 250 parts of cyclohexane and heated to 79° C. with stirring in a nitrogen atmosphere. Thereafter 550 parts of a mixture comprising 40 more parts of the product obtained according to Part A of Example 1, 240 parts methyl methacrylate, 120 parts hydroxypropyl methacrylate, 7.2 parts lauroyl peroxide and 142.8 parts cyclohexane were added dropwise over 4¾ hours while maintaining the temperature at 77–81° C. After cooling as in Example 1, the product obtained was a thick milky dispersion useful for coating purposes.

EXAMPLE 3

Example 1 was repeated except that the hydroxy propyl methacrylate was replaced by about 25 parts hydroxyethyl methacrylate and 5 parts acrylic acid. The product was a thick stable dispersion useful for coating.

EXAMPLE 4

125 parts of the butylated melamine-formaldehyde product prepared according to Part A of Example 1 and 360 parts of cyclohexane were mixed together and heated to 71° C. under nitrogen. Thereafter 515 parts of a mixture comprising 37 parts lauryl methacrylate, 375.5 parts methyl methacrylate, 12.5 parts acrylic acid, 12.5 parts hydroxypropyl methacrylate, 8.0 parts VAZO (azobisisobutyrlnitrile) and 69.5 parts cyclohexane were added over 6½ hours at a temperature of 69–71° C. Thereafter the reaction mixture was agitated for an hour at 71° C. and then cooled rapidly. The product was a stable white polymer dispersion which was smooth and flowable and gave excellent films on coating and baking.

EXAMPLE 5

*Part A*

18 parts melamine, 63 parts butyl formaldehyde solution (40%), 14 parts butyl alcohol, 5 parts xylene and 0.03 part phthalic anhydride were heated to remove water for five hours until a naptha tolerance of 110 was reached. Butyl alcohol was removed until a viscosity of $Z_4$–$Z_5$ (70%), Gardner-Holdt, was obtained. The ratio of formaldehyde to melamine in the product was about 5–6:1.

*Part B*

177 parts of the above product were mixed with 232 parts of a branched chain aliphatic hydrocarbon in the isooctane range, 79.6 parts of a branched chain aliphatic hydrocarbon in the isodecane range, and 1 part benzoyl peroxide. The mixture was heated with agitation to 80° C. under a nitrogen atmosphere. A temperature of 80° C. was maintained throughout the dispersion preparation. To the above mixture, a second mixture of 490.4 parts composed of 160 parts methyl methacrylate, 105 parts butyl acrylate, 55 parts butyl methacrylate, 50 parts hydroxypropyl methacrylate, 7 parts acrylic acid, 8.4 parts benzoyl peroxide, 35 parts lauryl alcohol, 49 parts of the isooctane type hydrocarbon above, and 21 parts of the isodecane type hydrocarbon above was added continuously over a five hour period. The temperature was held at 80° C. for 1½ hours after completion of the addition. The resulting dispersion was milky white and free flowing, with a polymer solids content of 50%. The melamine concentration based on polymer solids was 25%.

EXAMPLE 6

Example 4 was repeated except that 250 parts of the butylated melamine-formaldehyde condensate and 250 parts of cyclohexane were first mixed together and 500 parts of a mixture comprising 350 parts methyl methacrylate, 25 parts acrylic acid, 7.5 parts lauroyl peroxide and 117.50 parts cyclohexane were added to the resulting solution while maintaining a temperature of 73–77° C. The polymer dispersion thus obtained had a low viscosity and poured easily. It had a very white color and smooth appearance and gave films of outstanding characteristics.

EXAMPLE 7

350 parts of the melamine-formaldehyde product obtained in Part A of Example 1 were mixed with 215.5 parts cyclohexane and 99.5 parts low odor mineral spirits. The mixture was heated with agitation to 75° C. under a nitrogen atmosphere. A mixture composed of 230 parts methyl methacrylate, 55 parts hydroxypropyl methacrylate, 7.5 parts acrylic acid, 32.5 parts butyl methacrylate and 10 parts lauroyl peroxide was then added continuously over a four hour period to form the dispersion. After completion of the addition, the reaction mixture was held at 75° C. for one hour. The resulting reaction product was a white, free flowing dispersion with a polymer solids content of 52%. The melamine-formaldehyde concentration based on polymer solids was 35%. When cast on glass and baked for 30 minutes at 250° F., the dispersion produced a hard tough film suitable for coating purposes.

EXAMPLE 8

*Part A*

15 parts melamine, 54 parts butyl formaldehyde solution (40%), 3 parts butyl alcohol, and 0.03 parts phthalic anhydride were heated to reflux for five minutes. Thereafter 23 parts lauryl alcohol and 5 parts xylene were added, and the mixture was heated to remove water for eight hours until a naptha tolerance of 200+ was reached. The Gardner-Holdt viscosity was Z (70%) and the ratio of formaldehyde to melamine in the product was about 5–6:1.

*Part B*

176 parts of the above product were dissolved in a mixture of 343.5 parts low odor mineral spirits, 86 parts n-octane, and 1.3 parts benzoyl peroxide. The mixture was heated with agitation to 80° C. under a nitrogen atmosphere. Thereafter a mixture composed of 236 parts ethyl acrylate, 78.5 parts styrene, 66.5 parts hydroxypropyl methacrylate, 7 parts acrylic acid, and 5.2 parts benzoyl peroxide was added continuously over a 5½ hour period. A temperature of 80° C. was maintained throughout the above addition period during which time the dispersion formed. A temperature of 80° C. was maintained for a one hour period after the above addition was complete. The reaction product was a milky white dispersion of low viscosity with a polymer solids content of 50%. The melamine-formaldehyde concentration based on polymer solids is 25%. Films of the dispersion, when baked, were hard and clear and exhibited very good properties useful in coatings.

EXAMPLE 9

Part A 18 parts melamine, 63 parts butyl formaldehyde solution (40%), 14 parts butyl alcohol, 5 parts xylene and 0.03 parts phthalic anhydride were heated to remove water for six hours until a naptha tolerance of 200 was reached. Butyl alcohol was removed until a viscosity of $Z_3$—$Z_4$ (70%) Gardner-Holdt was obtained. The ratio of formaldehyde to melamine in the product was about 5–6:1.

Part B 145 parts of the above product were mixed with 160 parts n-octane, 160 parts low odor mineral spirits and 1 part benzoyl peroxide. The mixture was heated to 80° C. with stirring under a nitrogen atmosphere. A temperature of 80° C. was maintained during the ensuing dispersion preparation. A mixture of 534 parts composed of 194.7 parts methyl methacrylate, 142.5 parts butyl acrylate, 60.5 parts butyl methacrylate, 26.5 parts hydroxypropyl methacrylate, 5.3 parts acrylic acid, 37 parts lauryl alcohol, 30.5 parts n-octane, 30.5 parts low odor mineral spirits, and 6.5 parts benzoyl peroxide were added dropwise over a six hour period during which the dispersion formed. The temperature was held at 80° C. for 1½ hours after the above addition was complete. The reaction product was a white, stable, low viscosity dispersion of 53% polymer solids content. The melamine concentration based on polymer solids is 20%. Baked films of this dispersion are hard, tough, and clear and possess properties useful for coating.

EXAMPLE 10

102 parts of the melamine-formaldehyde product obtained in Part A of Example 9 were dissolved in 340.2 parts of a branched chain aliphatic hydrocarbon in the isooctane range, 85 parts low odor mineral spirits and 0.8 parts benzoyl peroxide. This mixture was heated with stirring to 80° C. under a nitrogen atmosphere. A mixture of 175 parts methyl methacrylate, 102.5 parts butyl acrylate, 57.5 parts butyl methacrylate, 90 parts hydroxypropyl methacrylate, 35 parts lauryl alcohol, and 12 parts benzoyl peroxide was added continuously over a five hour period to form the dispersion. A temperature of 80° C. was maintained for 1½ hours after the addition was complete. The reaction mixture was a white low viscosity dispersion with a polymer solids content of 50%. The melamine content based on polymer solids was 15%. Films when cast on glass and baked exhibited properties desirable for coating application.

EXAMPLE 11

110 parts of the melamine-formaldehyde product obtained in Part A of Example 9 were dissolved in a mixture of 160 parts n-octane, 160 parts low odor mineral spirits, and 1 part benzoyl peroxide and the resulting mixture heated to 80° C. with agitation under a nitrogen blanket. Thereafter a mixture comprising 190.7 parts methyl methacrylate, 141 parts butyl acrylate, 92 parts butyl methacrylate, 26.5 parts hydroxypropyl methacrylate, 5.3 acrylic acid, 6.5 parts benzoyl peroxide, 37 parts lauryl alcohol, 35 parts n-octane, and 35 parts low odor mineral spirits were added dropwise over a six hour period at a temperature of 80°–82° C. Upon completion of the addition, a temperature of 80° C. was maintained for 1½ hours. The reaction product was a white, smooth, free flowing dispersion with a polymer solids content of 53%. The dispersion when cast on glass exhibited properties useful for coatings.

EXAMPLE 12

Example 8 was repeated except that 36 parts of the ethyl acrylate were replaced with acrylonitrile to give essentially the same results.

It will be appreciated that various modifications may be made in the foregoing without deviating from the invention. Hence the scope of the invention is defined in the following claims wherein:

We claim:

1. A process for obtaining a stable polymer dispersion or organosol which comprises copolymerizing (1) a vinyl monomer which is free from functional —OH and —COOH groups selected from the group consisting of alkyl acrylates, alkyl methacrylates, styrene, acrylonitrile and acrylamide and (2) an acrylic or methacrylic monomer containing a functional —OH and/or —COOH group selected from hydroxy alkyl acrylates, hydroxy alkyl methacrylates, acrylic acid or methacrylic acid in the presence of (3) a solution of an alkylated melamine-formaldehyde reaction product dissolved in an essentially aliphatic hydrocarbon in which the copolymer of components (1) and (2) is insoluble there being used, on a weight basis, 60–98% of component (1) and 40–2% of component (2) and the amount of melamine-formaldehyde condensate to total copolymer components being in the range of 5–50% condensate for 95–50% copolymer components, by weight.

2. The process of claim 1 wherein component (2) is selected from the group consisting of hydroxy alkyl acrylates and hydroxy alkyl methacrylates.

3. The process of claim 1 wherein component (2) is hydroxypropyl methacrylate or acrylate.

4. The process of claim 1 wherein component (2) is hydroxyethyl methacrylate or acrylate.

5. The process of claim 1 wherein component (2) comprises a mixture of hydroxypropyl methacrylate and acrylic acid.

6. The process of claim 1 wherein component (1) comprises a mixture of said vinyl monomers.

7. The process of claim 1 wherein said melamine-formaldehyde reaction product has a naphtha tolerance of at least 15.

8. The process of claim 1 wherein the melamine-formaldehyde solution includes a minor amount of an alkanol.

9. The stable polymer dispersion obtained by the process of claim 1.

References Cited

UNITED STATES PATENTS

| | | | |
|---|---|---|---|
| 3,284,394 | 11/1966 | Suen et al. | 260—856 |
| 2,931,742 | 4/1960 | Hicks | 260—851 |
| 3,095,388 | 6/1963 | Osmond et al. | 260—33.6 |
| 3,166,524 | 1/1965 | Schmidle et al. | 260—33.6 |
| 3,261,788 | 7/1966 | Carter et al. | 260—336 |

MORRIS LIEBMAN, *Primary Examiner.*

ALLEN LIEBERMAN, *Examiner.*